(12) United States Patent
Klein (10) Patent No.: US 7,457,140 B2
(45) Date of Patent: Nov. 25, 2008

(54) POWER CONVERTER WITH HYSTERETIC CONTROL

(75) Inventor: Jonathan Klein, Palo Alto, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 14 days.

(21) Appl. No.: 11/506,299

(22) Filed: Aug. 18, 2006

(65) Prior Publication Data

US 2008/0042633 A1     Feb. 21, 2008

(51) Int. Cl.
*H02M 7/5387* (2007.01)
*G05F 1/613* (2006.01)

(52) U.S. Cl. .................. 363/132; 323/225; 323/288
(58) Field of Classification Search ............. 323/222, 323/225, 282, 288, 351; 363/132
See application file for complete search history.

(56) References Cited

U.S. PATENT DOCUMENTS

| | | | |
|---|---|---|---|
| 6,828,762 B2* | 12/2004 | Brkovic | 323/222 |
| 6,894,471 B2* | 5/2005 | Corva et al. | 323/282 |
| 7,061,157 B2* | 6/2006 | Battaglin et al. | 310/317 |
| 7,265,498 B2* | 9/2007 | Liu | 315/224 |

OTHER PUBLICATIONS

PCT International Search Report for International Application No. PCT/US07/18308 and Written Opinion, 11 pages.

* cited by examiner

*Primary Examiner*—Jessica Han
(74) *Attorney, Agent, or Firm*—Sidley Austin LLP (57) ABSTRACT

According to an embodiment of the present invention, a method is provided for hysteretic control of a DC-to-DC power converter system having first and second switches connected in a half-bridge arrangement at a common node and through an inductor to a regulated output terminal, wherein the regulated output terminal is connectable to an output capacitor and a load. The method includes the following: generating a feedback signal which tracks current flowing through the inductor; comparing the feedback signal against a reference voltage to generate a control signal; and controlling the magnitude of an output voltage which appears at the regulated output terminal in response to the control signal, thereby providing hysteretic control of the DC-to-DC converter which is not dependent on an equivalent series resistance (ESR) of the output capacitor.

25 Claims, 5 Drawing Sheets

POWER CONVERTER WITH HYSTERETIC CONTROL

BACKGROUND

1. Field of Invention

The present invention relates to power converters, and more particularly, to a power converter with hysteric control.

2. Description of Related Art

Power converters are essential for many modern electronic devices. Among other capabilities, power converters can adjust voltage level downward (buck converter) or adjust voltage level upward (boost converter). Power converters may also convert from alternating current (AC) power to direct current (DC) power, or vice versa. Power converters are typically implemented using one or more switching devices, such as transistors, which are turned on and off to deliver power to the output of the converter. Power converters may also include one or more capacitors or inductors.

In some applications for power converters, the load current may vary significantly (e.g., over several orders of magnitude), in which case it is desirable to have rapid response in the regulation or control of the converters. One form of regulating a power converter is hysteretic control, also know as bang-bang control or ripple regulation. In a typical implementation, a hysteretic regulator will turn on the switching device of a power converter when Vout is below a certain voltage (e.g., 5V), and will turn off the switching device of the converter when Vout is above the voltage.

Hysteretic regulators offer advantages over loops containing a compensated error amplifier, known as "linear control" loops. One advantage is very fast load transient response, which minimizes the required output capacitor value. Another advantage of a hysteretic regulator is that no loop compensation components are required. But hysteretic regulators have certain drawbacks. For example, such regulators are prone to unstable behavior with an output capacitor (Cout) having low equivalent series resistance (ESR). More specifically, when Cout has a small value of ESR, the output voltage Vout of the converter will not rise with the switching device turning on, thus resulting in chaotic behavior. This unstable behavior results from the feedback not being in phase with the inductor current.

To address such drawback, a power converter according to one previously developed design uses a transconductance (GM) amplifier to sense the voltage across the inductor. Such converter then creates a ramp using a capacitor and sums it with a DC error voltage from an error amplifier. A disadvantage of this previously developed design is that it requires the use of a separate error amplifier, thus resulting in a more complicated control to implement hysteretic regulation.

SUMMARY

According to an embodiment of the present invention, in a DC-to-DC power converter system having first and second switches connected in a half-bridge arrangement at a common node and through an inductor to a regulated output terminal, wherein the regulated output terminal is connectable to an output capacitor and a load, a method is provided for hysteretic control of the DC-to-DC converter. The method includes the following: generating a ramp voltage which is proportional to current flowing through the inductor; summing the ramp voltage with an output voltage which appears at the regulated output terminal of the DC-to-DC power converter to provide a feedback signal which tracks the inductor current; and controlling the DC-to-DC converter in response to the sum of the ramp voltage and the output voltage, thereby providing hysteretic control of the DC-to-DC converter which is not dependent on an equivalent series resistance (ESR) of the output capacitor.

According to another embodiment of the present invention, in a DC-to-DC power converter system having first and second switches connected in a half-bridge arrangement at a common node and through an inductor to a regulated output terminal, wherein the regulated output terminal is connectable to an output capacitor and a load, a method is provided for hysteretic control of the DC-to-DC converter. The method includes the following: generating a feedback signal which tracks current flowing through the inductor; comparing the feedback signal against a reference voltage to generate a control signal; and controlling the magnitude of an output voltage which appears at the regulated output terminal in response to the control signal, thereby providing hysteretic control of the DC-to-DC converter which is not dependent on an equivalent series resistance (ESR) of the output capacitor.

In various embodiments, a system and method for a hysteretic regulator are provided in which the stability of the control loop is not dependent of the equivalent series resistance (ESR) of the output capacitor.

In some embodiments, a system and method for hysteretic control of a power converter includes circuitry for summing the output voltage of the converter with a ramp voltage which is proportional to the inductor current, thereby providing for stable operation of the hysteretic control.

In various embodiments, the hysteretic control circuitry for summing the output voltage with a ramp voltage (proportional to the current flowing through the inductor) includes a switch, a capacitor, and a ramp resistor to cause the stable operation of voltage mode hysteretic control. In some embodiments, the ramp resistor can be replaced with either a switched current source or a single conductance (GM) stage.

In some embodiments, the power converter system can have a constant frequency. The loop's frequency can be adjusted by either controlling the hysteresis aperture or by dynamically controlling the ramp current (e.g., the value of the ramp resistor). Frequency feedback, or Vin and Vout feedback, can be used to adjust the loop's frequency in order to hold it constant.

In various embodiments, a phase locked loop (PLL) can also be used if the regulator is required to be phase locked to an external frequency source.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 9 of the drawings. Like numerals are used for like and corresponding parts of the various drawings.

Figure 1:
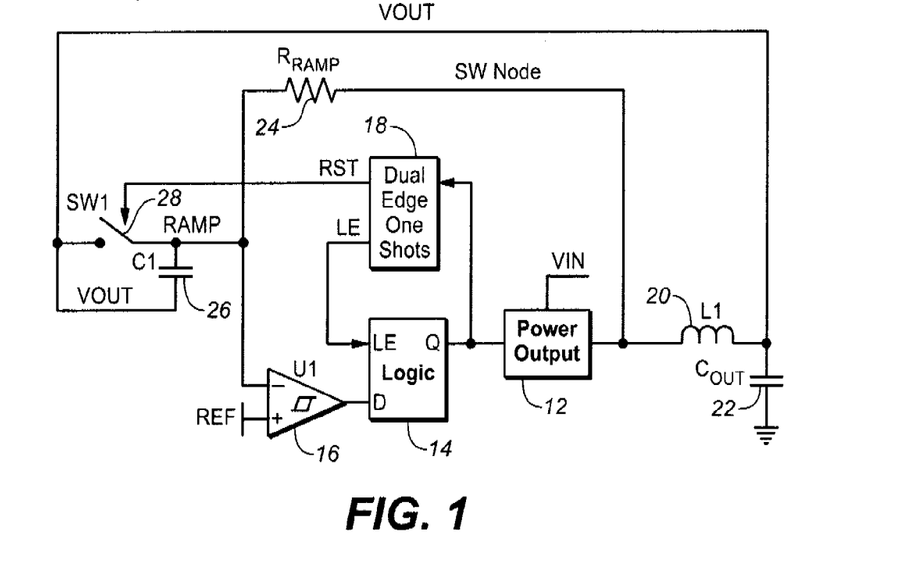
FIG. 1 is a schematic diagram of an implementation of a power converter system, according to an embodiment of the invention.

FIG. 1 is a schematic diagram of an implementation of a power converter system 10, according to an embodiment of the invention. Power converter system 10 can provide a direct current (DC) power. Power converter 10 can be incorporated in or used with any electronic device in which a DC-to-DC converter as described herein is needed. Power converter system 10 receives an input voltage Vin and provides the DC power to a load at an output terminal Vout. As shown, power converter system 10 includes a power output circuit 12, a logic circuit 14, a hysteretic comparator 16, dual edge one shot circuit 18, an inductor 20, an output capacitor 22, a ramp resistor 24, a capacitor 26, and a switch 28.

The inductor 20 is coupled to the output capacitor 22 at the output terminal of the power converter system 10. As used herein, the terms "coupled" or "connected," or any variant thereof, covers any coupling or connection, either direct or indirect, between two or more elements. The power output circuit 12 is coupled to the inductor 20. Power output circuit 12 may comprise one or more switches which are turned on when the control signal (Q) of logic circuit 14 is high and turned off when the control signal is low to ramp up and down the current of inductor 20, thereby charging and discharging output capacitor 22 and providing the output voltage Vout at the output terminal. An exemplary implementation for power output circuit 12 is shown and described in detail with reference to FIG. 2.

Logic circuit 14 is coupled and provides a control signal (Q) to the power output circuit 12. This control signal controls the turning on and off of the switches in the power output circuit 12. The control signal of logic circuit 14 is also provided to dual edge one shot circuitry 18. Dual edge one shot circuit 18 provides pulses (RST and LE) at the rising as well as the falling edge of the control signal Q. Each RST pulse closes switch 28 to reset capacitor 26. Each LE pulse, which is longer than RST pulse, is used to hold the state of the D input to logic circuit 14, thereby preventing the transients on RAMP node from causing a state change during the time that the LE pulse is high. Logic circuit 14 can be implemented as any suitable logic circuit, such as a D flip-flop, RS flip-flop, or other circuit that performs a latching function. The logic circuit 14 has inputs for receiving signals from the hysteretic comparator 16 and dual edge one shot circuit 18. For a D flip-flop, as shown, these inputs are data (D) and latch enable (LE), respectively. In one embodiment, logic circuit 14 can perform a latch function which latches the state of the D input, and provides this as output at Q (as the control signal).

Power converter system 10 has control circuitry for providing or supporting hysteretic control. In general, hysteretic pulse width modulation (PWM) controllers have very fast transient response compared to traditional "closed loop" controls using an error amplifier and ramp. Typically, hysteretic control is implemented using a comparator with hysteresis The hysteretic comparator compares the output voltage against a reference voltage. The control circuitry, according to embodiments of the present invention, allows or enables a hysteretic voltage mode control to maintain stability of the power converter system 10, even if used with an output capacitor 22 having very low or almost no ESR. The hysteretic control circuitry accomplishes this by summing the output voltage Vout with a ramp voltage proportional to the current through inductor 20. This is equivalent to adding the AC component of the inductor current to Vout, which simulates ESR for the output capacitor 22. In turn, this causes the power converter system's feedback voltage, which appears at the RAMP node, to be in phase with the current through inductor 20, thereby providing stable operation for the system. As shown, the control circuitry may include hysteretic comparator 16, dual edge one shot circuit 18, ramp resistor 24, capacitor 26, and switch 28.

The ramp resistor 24 and the capacitor 26 are connected at a RAMP node, and may function or cooperate to add or sum output voltage Vout with a voltage which tracks the current flowing through inductor 20. In other embodiment, the summing of the output voltage feedback and the inductor ramp current is accomplished in other ways. The sum of the output voltage Vout and the voltage which tracks the inductor current ramp is provided at the RAMP node. The voltage tracking the inductor ramp current is generated by resetting capacitor 26 after each transition of the control signal from logic circuit 14—i.e., the Q output signal of the DQ flip-flop transitioning from Low to High, or from High to Low. A transition of the control signal (Q) triggers the dual edge one shot circuit 18, which outputs a short pulse (RST) to close switch 28. This sets the voltage at the RAMP node (where ramp resistor 24 is connected to capacitor 26) to Vout. The capacitor 26 is shorted out when switch 28 is closed.

Hysteretic comparator 16, with associated hysteresis window, may directly set the magnitude of the ripple voltage Vout. The hysteretic comparator 16 has two inputs. At one input, comparator 16 receives a reference signal REF. At the other input (RAMP node), the hysteretic comparator 16 receives a signal which corresponds to or represents the sum of the output voltage Vout and a voltage proportional to the inductor's AC current ramp. The hysteretic comparator 16 compares this voltage to the reference signal REF, and in response provides an output signal to the one input of the logic circuit 14 (e.g., D input of the DQ flip-flop). The dual edge one shot circuit 18 outputs a reset (RST) signal and a latch enable (LE) signal. The RST signal comprises a number of pulses, each of which is output when there is a transition of the Q output signal from the logic circuit 14. The RST signal opens and closes switch 28. The LE signal is provided to the LE input of the logic circuit 14 to enable and disable the circuit.

While the switch 28 is closed and capacitor 26 is being reset, the control signal (Q output) from logic circuit 14 is latched in the new state, and further transitions at the D input (connected to receive the output of hysteretic comparator 16) are ignored until the dual edge one shot circuit 18 times out and causes the value of the RST signal to change, thereby opening switch 28. When the one shot circuit 18 times out, capacitor 26 either charges from Vout if the control signal (Q) from logic circuit 14 is high or discharges from Vout if the control signal is low. The charging or discharging current is created by the voltage across ramp resistor 24. Since the RAMP node is the same as Vout when the switch 28 is closed, the voltage across ramp resistor 24 is the same as the voltage across inductor 20, thereby creating a slope on capacitor 26 (if the output capacitor 22 is relatively large, and the voltage value of Vout is constant over the cycle) which is the same as the current slope of inductor 20.

Thus, in one embodiment, the power converter system 10 uses a single capacitor 26 to generate a ramp voltage (at the RAMP node), and to sum that ramp voltage with the output voltage Vout. The switch 28 resets the voltage of the capacitor 26 to the value of the output voltage VOUT after each transition of the output control signal Q from the logic circuit 14. The timing for the capacitor reset switch 28 is generated by the circuit 18 which outputs a pulse on each rising or falling edge of the control signal Q (i.e., dual-edge triggered one-shot), where the pulse width of each pulse is proportional to the inductor current's di/dt.

In various embodiments, all or a portion of power converter system 10 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals therebetween.

Figure 2:
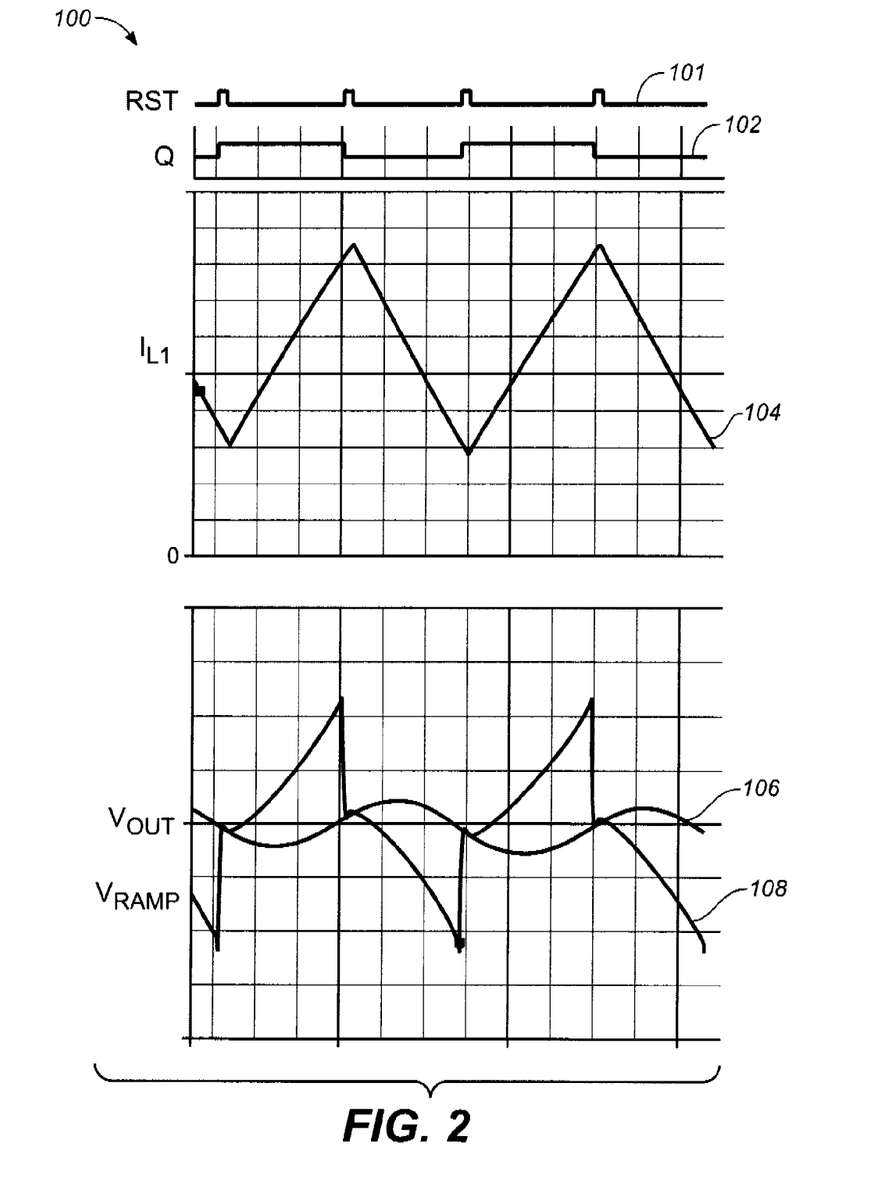
FIG. 2 is an exemplary waveform diagram for a power converter system, according to an embodiment of the invention.

The operation of power converter system 10 with hysteretic control circuitry can be understood with reference to FIG. 2, which is an exemplary waveform diagram 100 for the system, according to an embodiment of the invention. Waveform diagram 100 has waveforms 101, 102, 104, 106, and 108 which generally represent, respectively, the reset signal (RST) output from dual edge one shot circuit 18, the control signal (Q) output from logic circuit 14, the current flowing through inductor 20, the output voltage Vout, and the voltage on the RAMP node.

When the output control signal (Q) output from logic circuit 14 is high, the current ($I_{L1}$) flowing through inductor 20 increases in value. Conversely, when the output control signal is low, the current ($I_{L1}$) flowing through inductor 20 decreases in value. This produces a ramp waveform for the current flow of inductor 20, as seen in FIG. 2. The output voltage Vout is a semi-sinusoidal waveform due to the ramping up and down of the inductor current, which charges and discharges the output capacitor 22. The voltage at the RAMP node ($V_{RAMP}$) is the sum of the output voltage Vout and the voltage which tracks the inductor ramp current. As the inductor current $I_{L1}$ increases, so does the voltage $V_{RAMP}$. As the inductor current $I_{L1}$ decreases, the voltage $V_{RAMP}$ also decreases. Each time a transition occurs in the output control signal (Q), the dual edge one shot circuit 18 outputs a RST signal which closes switch 28. This shorts out capacitor 26, and causes the RAMP node to have the same voltage as Vout (i.e., the voltage $V_{RAMP}$ equals Vout). After each RST pulse, the voltage $V_{RAMP}$ (the voltage of the RAMP node) will have a value which is the sum of the output voltage Vout and the voltage proportional to the inductor current ($I_{L1}$). Further transitions of the Q output signal from the logic circuit 14 are locked out by the blanking circuit (for the duration of the LE pulse, which is longer than the RST pulse) to allow the power converter system 10 to settle.

The power converter system 10 thus has hysteretic voltage mode control to maintain stability of the system, even if used with an output capacitor 22 having very low or almost no ESR. The hysteretic control circuitry sums the output voltage Vout with a ramp voltage proportional to the current through inductor 20, which is equivalent to adding the AC component of the inductor current to Vout. As such, ESR for the output capacitor 22 is simulated. This causes the current output from power converter system 10 to be in phase with Vout, thereby providing stable operation for the system.

Thus, in various embodiments, a system and method for a hysteretic regulator are provided in which the stability of the control loop is independent of the equivalent series resistance (ESR) of the output capacitor.

In some embodiments, in shown in FIG. 1, the hysteretic regulator uses a switch across a capacitor to reset the input to the hysteretic comparator. No error amplifier is required since the output voltage itself creates the regulation signal and the slope on the capacitor simulates the output capacitor's ESR. This results in a simplified circuit compared to previously developed designs. That is, in some embodiments, by using a switch to reset the capacitor 26 after every transition of the control signal Q, the present invention eliminates the need for an error amplifier (to perform an outer DC loop regulation).

Furthermore, because the additional error amplifier for DC loop regulation is not required, hysteretic regulators according to embodiments of the invention can respond faster to transient events, and can be compensated and analyzed more simply.

In addition, the establishment of a DC voltage at the RAMP node at the beginning of each cycle allows the use of a current source scheme (e.g., with a simple resistor feeding back from the output node voltage to create the charge and discharge current for capacitor 26) to replace the conductance (GM) amplifier of previously developed designs.

Figure 3:
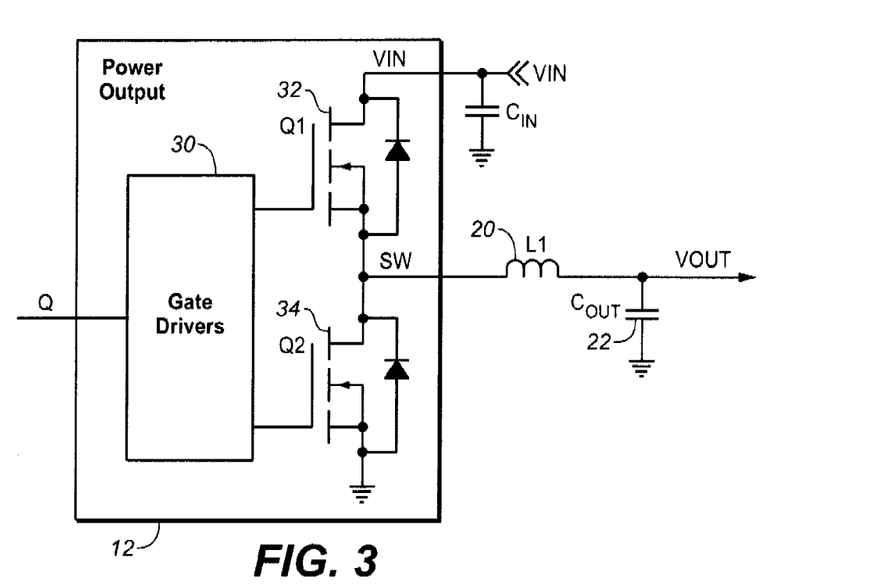
FIG. 3 is a schematic diagram of an implementation of a power output circuit for a power converter system.

FIG. 3 is a schematic diagram of an implementation of a power output circuit 12 for a power converter system 10. The power output circuit 12 provides output signals which cause the current flowing through inductor 20 to ramp up and down, thereby charging and discharging output capacitor 22 and providing the output voltage Vout at the output terminal. As depicted, power output circuit 12 comprises a gate driver circuit 30 and switches 32, 34.

Switches 32 and 34 are connected at a node SW in a half-bridge arrangement, with switch 32 being the "high-side" switch and switch 34 being the "low-side" switch. As the high-side switch, switch 32 may be connected between the input voltage Vin and node SW. As the low-side switch, switch 34 may be connected between the node SW and ground (GND). Each of switches 32 and 34 can be implemented with any suitable device, such as, for example, a metal-oxide-semiconductor field effect transistor (MOSFET), an IGBT, a MOS-gated thyristor, or other suitable power device. Each switch 32, 34 has a gate to which driving voltage may be applied to turn the switch on or off. In some embodiments, a diode may also be used in place of switch 34.

Gate driver circuit 30 is connected to the gates of switches 32 and 34, and outputs control signals for turning on and off the switches 32 and 34. Gate driver circuit 30 receives the control signal (Q output) from logic circuit 14. When the control signal Q is a logic 1, gate driver circuit 30 turns off switch 34 and then turns on switch 32. When the control signal Q is a logic 0, gate driver circuit 30 turns off switch 32 and then turns on switch 34. In some embodiments, power output circuit 12 may also turn off both switches 32 and 34 simultaneously to prevent current reversal in inductor 20.

When gate driver circuit 30 turns on high-side switch 32, the power converter system 10 ramps up the inductor current of inductor 20 and charges up capacitor 22. When gate driver circuit 30 turns on low-side switch 34, the power converter system 10 ramps down the current of inductor 20 and discharges capacitor 22. The switches 32 and 34 are alternately driven. That is, the high-side switch 32 is not turned on simultaneously with the low-side switch 34.

Other implementations for a power converter system, according to embodiments of the present invention, are possible. In one such implementation, the ramp resistor 24 can be replaced with either a switched current source or a single conductance (GM) stage. In another implementation, the power converter system can have a constant frequency. Frequency feedback, or Vin and Vout feedback, can be used to adjust the loop's frequency in order to hold it constant. For example, the loop's frequency can be adjusted by either controlling the hysteresis aperture or by controlling the ramp current (e.g., the value of the ramp resistor 24) dynamically. In other implementations, a phase locked loop (PLL) can also be used if the regulator is required to be phase locked to an external frequency source. Other enhancements or features can be provided in the power converter system according to various embodiments including, circuitry for implementing soft-start and end of soft-start detection, current limiting, droop, and multi-phase operation. Such implementations are shown and described with reference to FIGS. 4 through 9 below.

Figure 4:
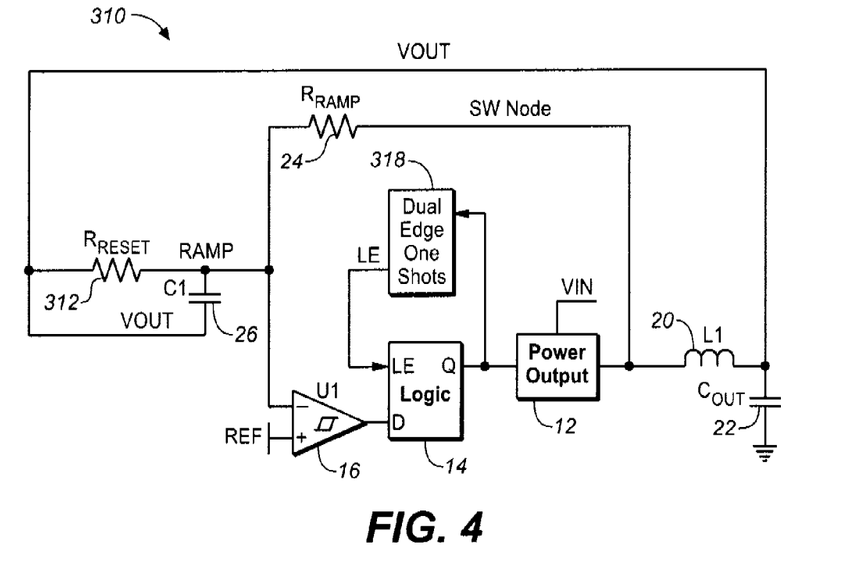
FIG. 4 is a schematic diagram of another implementation of a power converter system, according to an embodiment of the invention.

FIG. 4 is a schematic diagram of another implementation of a power converter system 310, according to an embodiment of the invention. Power converter system 310 can provide a direct current (DC) power at Vout. Power converter system 310 shown in FIG. 4 is similar to power converter system 10 shown in FIG. 1, and as such, includes a power output circuit 12, a logic circuit 14, a hysteretic comparator 16, dual edge one shot circuit 318, an inductor 20, an output capacitor 22, ramp resistor 24, and a capacitor 26. Instead of a switch 28 like power converter system 10, power converter system 110 has a resistor 312. This simplifies the control logic for dual edge one shot circuit 318 (as compared to dual edge one shot circuit 18 in FIG. 1), and has the effect of providing more damping to the control loop.

Figure 5:
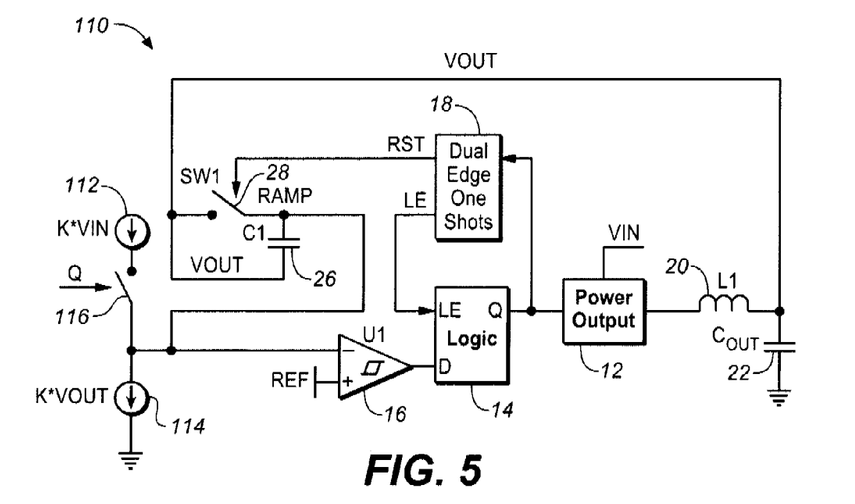
FIG. 5 is a schematic diagram of yet another implementation of a power converter system, according to an embodiment of the invention.

FIG. 5 is a schematic diagram of another implementation of a power converter system 110, according to an embodiment of the invention. Power converter system 110 can provide a direct current (DC) power at Vout. Power converter system 110 shown in FIG. 5 is similar to power converter system 10 shown in FIG. 1, and as such, includes a power output circuit 12, a logic circuit 14, a hysteretic comparator 16, dual edge one shot circuit 18, an inductor 20, an output capacitor 22, a capacitor 26, and a switch 28. Instead of a ramp resistor like power converter system 10, power converter system 110 has a switched current source. As shown, the switched current source can be implemented as current sources 112, 114 and a switch 116. Current source 112 provides a current for charging capacitor 26 and current source 114 provides a current for discharging capacitor 26. Switch 116 can be controlled by the control signal Q (output from logic circuit 14) and functions to connect and disconnect current source 112 to the RAMP node for charging the capacitor 26.

Figure 6:
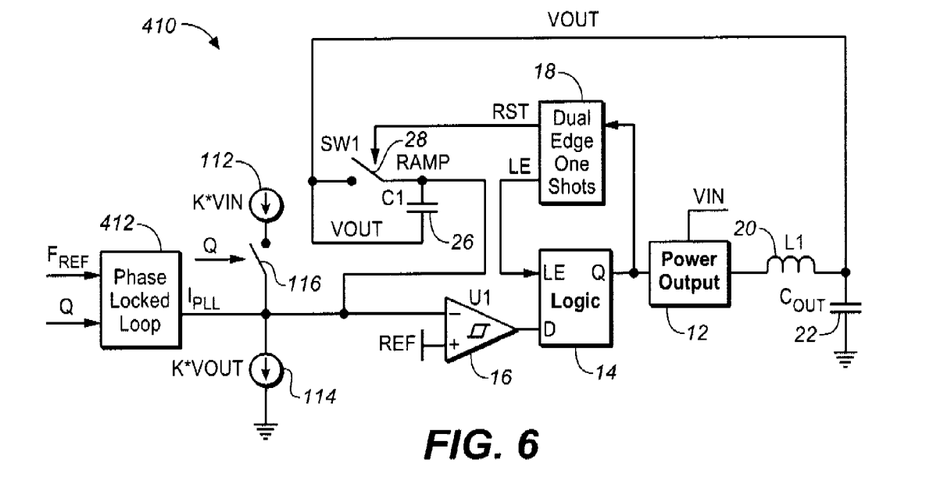
FIG. 6 is a schematic diagram of still another implementation of a power converter system, according to an embodiment of the invention.

FIG. 6 is a schematic diagram of another implementation of a power converter system 410, according to an embodiment of the invention. Power converter system 410 shown in FIG. 6 is similar to power converter system 110 shown in FIG. 5. Power converter system 410 also includes a frequency and/or phase lock loop (PLL) circuit 412. The PLL circuit 412 receives the control signal Q and a frequency reference ($F_{REF}$) signal, and outputs a PLL control current ($I_{PLL}$) which may be added to or subtracted from the currents of current sources 112 and 114. The PLL circuit can function to lock the frequency of the converter system to an external frequency source.

Figure 7:
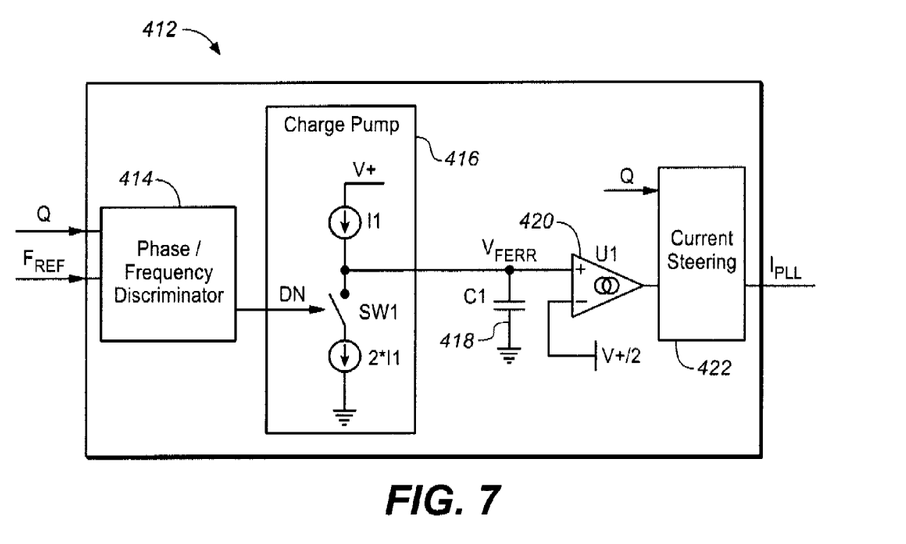
FIG. 7 is a schematic diagram of an implementation of a phase locked loop circuit for a power converter system.

FIG. 7 is a schematic diagram of an implementation of a phase locked loop (PLL) circuit 412 for a power converter system. As shown, PLL circuit 412 includes a phase/frequency discriminator block 414, a charge pump 416, a capacitor 418, a transconductance (GM) amplifier 420, and a current steering block 422.

In operation, if the frequency of control signal Q is higher than that of the frequency reference ($F_{REF}$) signal, the output signal DN from phase/frequency discriminator block 414 will be high more often than it is low. This causes the net current into capacitor 418 to be negative, thus charging down the capacitor. Conversely, if the frequency of control signal Q is lower than that of the frequency reference ($F_{REF}$) signal, then output signal DN will be low for more time than it is high. This causes the net current into capacitor 418 to be positive, thus charging up the capacitor. The voltage at the node for capacitor 418 is a frequency error ($V_{FERR}$) signal.

The frequency error ($V_{FERR}$) signal is provided to the non-inverting input terminal of the GM amplifier 420, which outputs a CD current proportional to the $V_{FERR}$ signal. Current steering block 422 will steer this CD current to the ramp capacitor 26 (FIG. 6) when the control signal Q is high, and inverts the CD current on the ramp capacitor 26 when the control signal Q is low. This is typically accomplished using current mirrors and switches. Alternatively, the $V_{FERR}$ signal can be directly used to set the current gain ("K" in FIG. 6) using multiplying GM amplifiers for the current sources 112 and 114 in FIG. 6.

Figure 8:
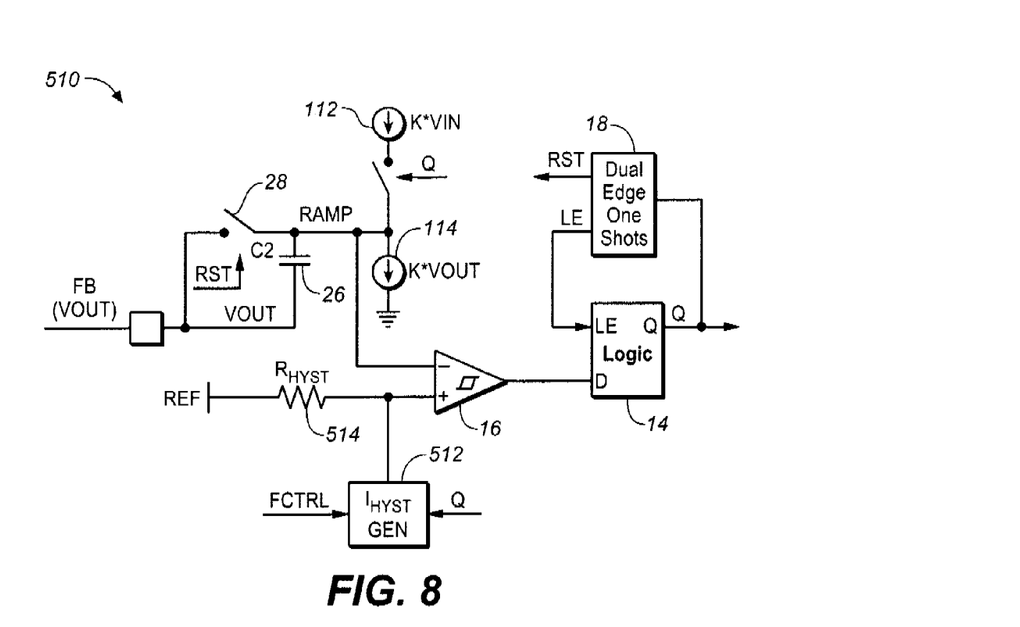
FIG. 8 is a schematic diagram of another implementation of a power converter system, according to an embodiment of the invention.

FIG. 8 is a schematic diagram of another implementation of a power converter system 510, according to an embodiment of the invention. In power converter system 510, the frequency is controlled by adjusting or changing the amount of hysteresis in the hysteretic comparator 16. In this implementation, frequency error ($V_{FERR}$) signal (see FIG. 7) controls the strength of a current source, which is used to set the amount of hysteresis. Increasing the hysteresis will cause the converter frequency to be lowered; decreasing hysteresis will cause the converter frequency to be increased.

In power converter system 510, the output of a PLL is used to control the hysteresis. A frequency control (FCTRL) signal sets the amount of current that a hysteresis current ($I_{HYST}$) generator block 512 sinks and sources. The $I_{HYST}$ generator block 512 sources current into a hysteresis resistor ($R_{HYST}$) 514 when the control signal Q is high, which causes the voltage at the non-inverting (+) terminal of the comparator 16 to be greater than a reference voltage REF. Conversely, when the control signal Q is low, the hysteresis current $I_{HYST}$ sinks through hysteresis resistor ($R_{HYST}$) 514, causing the non-inverting (+) terminal of the comparator 16 to be greater than the reference voltage REF. The frequency control (FCTRL) signal can be driven directly from frequency error ($V_{FERR}$) signal (FIG. 7), with the DN signal inverted (or the frequency input signals into the phase/frequency discriminator block 414 swapped), so that when the frequency of the control signal Q is greater than the frequency of the frequency reference ($F_{REF}$) signal, the $V_{FERR}$ signal will increase in voltage. Thus, the hysteresis generator can use the output of the phase/frequency discriminator circuit 414 (FIG. 7) to control the switching frequency.

Another method of controlling the frequency of the power converter system involves changing the amount of hysteresis based on VIN and VOUT. This implementation sets the hysteresis current ($I_{HYST}$) based on the following equation:

$$I_{HYST} = K1 * VIN + K2 * VOUT$$

where K1 and K2 are empirically derived by calculating the operating frequency with nominal values for K1 and K2, then varying VIN and VOUT over the desired operating range, and adjusting K1 and K2 until the frequency deviation is minimized. Similarly, the same frequency adjustments can be made based on VIN and VOUT by adjusting the charge and discharge currents for the RAMP capacitor 26 based on VIN and VOUT.

Figure 9:
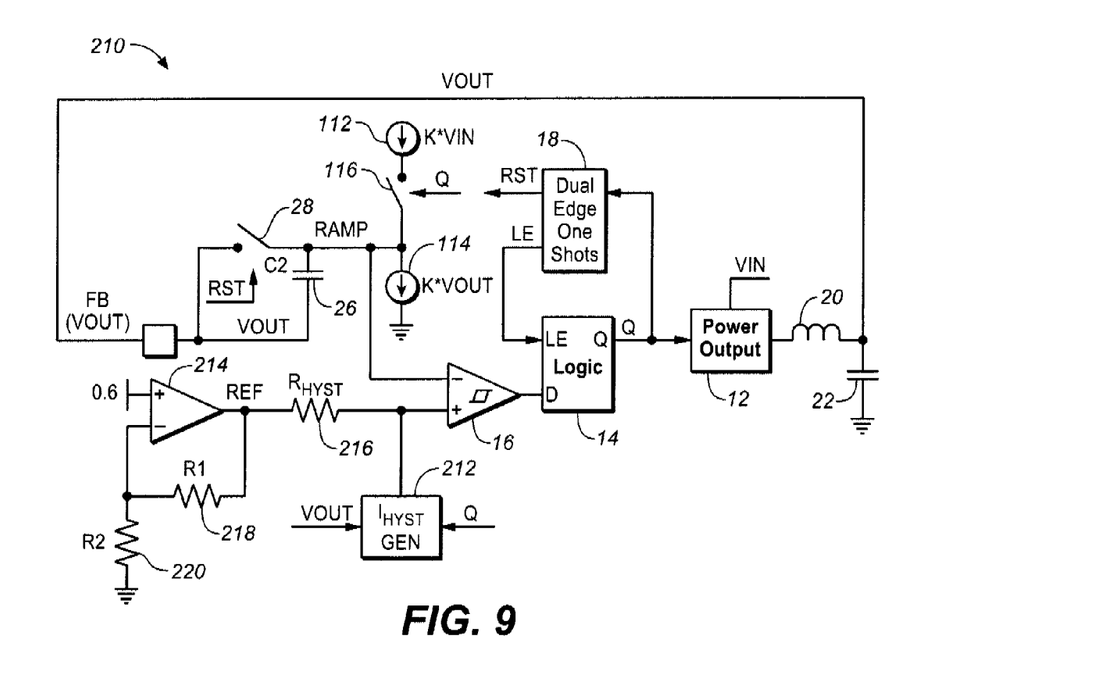
FIG. 9 is a schematic diagram of still yet another implementation of a power converter system, according to an embodiment of the invention.

FIG. 9 is a schematic diagram of yet another implementation of a power converter system 210, according to an embodiment of the invention. Power converter system 210 shown in FIG. 9 is similar to power converter system 10 shown in FIG. 1, and as such, includes a power output circuit 12, a logic circuit 14, a hysteretic comparator 16, dual edge one shot circuit 18, an inductor 20, an output capacitor 22, a capacitor 26, a switches 28, 116, and current sources 112, 114. Instead of a basic reference signal at the input of hysteretic comparator 16 like power converter system 10, power converter system 210 in FIG. 9 has other circuitry for providing a signal to that input of the comparator 16. As shown, this other circuitry includes a hysteric current ($I_{HYST}$) generator 212, an operational amplifier 214, and resistors 216, 218, and 220.

Thus, as described herein, systems and methods for a hysteretic regulator are provided in which the stability of the control loop is independent of the equivalent series resistance (ESR) of the output capacitor. Hysteretic regulators according to some embodiments simulate ESR. The system and method for hysteretic control of a power converter includes circuitry for summing the output voltage of the converter with a ramp voltage which is proportional to the inductor current, thereby providing for stable operation of the hysteretic control. In various embodiments, the hysteretic control circuitry for summing the output voltage with a ramp voltage (proportional to the current flowing through the inductor) includes a switch, a capacitor, and a ramp resistor to cause the stable operation of voltage mode hysteretic control. In some embodiments, the ramp resistor can be replaced with either a switched current source or a single conductance (GM) stage. In some embodiments, the frequency of the regulator can be controlled by adjusting the hysteresis, or ramp current, based on either a frequency comparator, phase locked loop, or a computation based on VIN and VOUT. In other embodiments, basic control loop involves various techniques for keeping the frequency constant over a variety of input and output voltage conditions.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. In a DC-to-DC power converter system having first and second switches connected in a half-bridge arrangement at a common node and through an inductor to a regulated output terminal, wherein the regulated output terminal is connectable to an output capacitor and a load, circuitry for hysteretic control of the DC-to-DC converter comprising:
   circuitry for generating a ramp voltage which is proportional to current flowing through the inductor;
   circuitry for summing the ramp voltage with an output voltage which appears at the regulated output terminal of the DC-to-DC power converter to provide a feedback signal which tracks the inductor current; and
   circuitry for controlling the DC-to-DC converter in response to the sum of the ramp voltage and the output voltage, thereby providing hysteretic control of the DC-to-DC converter which is not dependent on an equivalent series resistance (ESR) of the output capacitor.

2. The circuitry for hysteretic control of claim 1 wherein the circuitry for generating a ramp voltage comprises a ramp resistor connected to the inductor.

3. The circuitry for hysteretic control of claim 1 wherein the circuitry for generating a ramp voltage and the circuitry for summing comprises:
   a ramp resistor connected to the inductor; and
   a capacitor connected to the ramp resistor at a ramp node.

4. The circuitry for hysteretic control of claim 3 wherein the circuitry for summing comprising a switch operable to be turned on to connect the regulated output terminal to the ramp node.

5. The circuitry for hysteretic control of claim 1 wherein the circuitry for controlling comprises a hysteretic comparator operable to compare the feedback signal against a reference signal to generate an output signal.

6. The circuitry for hysteretic control of claim 5 wherein the circuitry for controlling comprises a logic circuit coupled to the hysteretic comparator and operable to provide control signals for turning on and off the first and second switches in response to the output signal.

7. The circuitry for hysteretic control of claim 6 comprising a third switch operable to be turned on to connect the regulated output terminal to a ramp node, wherein the circuitry for controlling comprises a one-shot circuit coupled to the logic circuit and operable to generate a signal for turning on the third switch.

8. The circuitry for hysteretic control of claim 1 wherein the circuitry for generating a ramp voltage and the circuitry for summing comprises:
   a third switch operable to be turned on to connect the regulated output terminal to a ramp node;
   a capacitor coupled to the ramp node; and
   a switched current source coupled to the ramp node and operable to charge and discharge the capacitor.

9. The circuitry for hysteretic control of claim 8 comprising a phase locked loop circuit coupled to the switched current source and operable to phase lock a frequency of the circuitry for hysteretic control to an external frequency source.

10. In a DC-to-DC power converter system having first and second switches connected in a half-bridge arrangement at a common node and through an inductor to a regulated output terminal, wherein the regulated output terminal is connectable to an output capacitor and a load, a method for hysteretic control of the DC-to-DC converter comprising:
   generating a ramp voltage which is proportional to current flowing through the inductor;
   summing the ramp voltage with an output voltage which appears at the regulated output terminal of the DC-to-DC power converter to provide a feedback signal which tracks the inductor current; and
   controlling the DC-to-DC converter in response to the sum of the ramp voltage and the output voltage, thereby providing hysteretic control of the DC-to-DC converter which is not dependent on an equivalent series resistance (ESR) of the output capacitor.

11. The method of claim 10 wherein generating a ramp voltage comprises providing a ramp resistor which is connected to the inductor.

12. The method of claim 10 comprising comparing the sum of the ramp voltage and the output voltage against a reference voltage.

13. The method of claim 10 wherein the feedback signal is in phase with inductor current.

14. The method of claim 10 comprising phase locking a frequency of the DC-to-DC power converter system to an external frequency source.

15. The method of claim 10 wherein controlling the DC-to-DC converter comprises turning on and off the first and second switches in response to the sum of the ramp voltage and the output voltage.

16. In a DC-to-DC power converter system having first and second switches connected in a half-bridge arrangement at a common node and through an inductor to a regulated output terminal, wherein the regulated output terminal is connectable to an output capacitor and a load, circuitry for hysteretic control of the DC-to-DC converter comprising:

means for generating a ramp voltage which is proportional to current flowing through the inductor;

means for summing the ramp voltage with an output voltage which appears at the regulated output terminal of the DC-to-DC power converter to provide a feedback signal which tracks the inductor current; and means for controlling the DC-to-DC converter in response to the sum of the ramp voltage and the output voltage, thereby providing hysteretic control of the DC-to-DC converter which is not dependent on an equivalent series resistance (ESR) of the output capacitor.

17. The circuitry for hysteretic control of claim 16 wherein the means for generating a ramp voltage comprises a ramp resistor connected to the inductor.

18. The circuitry for hysteretic control of claim 16 wherein the means for generating a ramp voltage and the means for summing comprises:

a ramp resistor connected to the inductor; and a capacitor connected to the ramp resistor at a ramp node.

19. The circuitry for hysteretic control of claim 16 wherein the means for controlling comprises a hysteretic comparator operable to compare the feedback signal against a reference signal to generate an output signal.

20. The circuitry for hysteretic control of claim 16 wherein the means for generating a ramp voltage and the circuitry for summing comprises:

a third switch operable to be turned on to connect the regulated output terminal to a ramp node;

a capacitor coupled to the ramp node; and a switched current source coupled to the ramp node and operable to charge and discharge the capacitor.

21. In a DC-to-DC power converter system having first and second switches connected in a half-bridge arrangement at a common node and through an inductor to a regulated output terminal, wherein the regulated output terminal is connectable to an output capacitor and a load, a method for hysteretic control of the DC-to-DC converter comprising:

generating a feedback signal which tracks current flowing through the inductor;

comparing the feedback signal against a reference voltage to generate a control signal; and controlling the magnitude of an output voltage which appears at the regulated output terminal in response to the control signal, thereby providing hysteretic control of the DC-to-DC converter which is not dependent on an equivalent series resistance (ESR) of the output capacitor.

22. The method of claim 21 wherein generating a feedback signal comprises:

generating a ramp voltage which is proportional to the inductor current; and summing the ramp voltage with an output voltage which appears at the regulated output terminal of the DC-to-DC power converter.

23. The method of claim 21 wherein the feedback signal is in phase with inductor current.

24. The method of claim 21 comprising phase locking a frequency of the DC-to-DC power converter system to an external frequency source.

25. The method of claim 21 wherein controlling the DC-to-DC converter comprises turning on and off the first and second switches in response to the control signal.

* * * * *